(12) United States Patent
Usami et al.

(10) Patent No.: US 7,501,732 B2
(45) Date of Patent: Mar. 10, 2009

(54) ELECTRIC ROTATING MACHINE

(75) Inventors: Shinji Usami, Okazaki (JP); Mitsuhiro Murata, Niwa-gun (JP); Kazuhiro Andoh, Okazaki (JP)

(73) Assignee: Denso Corporation, Kariya (JP)

( * ) Notice: Subject to any disclaimer, the term of this patent is extended or adjusted under 35 U.S.C. 154(b) by 400 days.

(21) Appl. No.: 11/442,305

(22) Filed: May 30, 2006

(65) Prior Publication Data
US 2006/0267433 A1  Nov. 30, 2006

(30) Foreign Application Priority Data
May 30, 2005 (JP) .............................. 2005-157550

(51) Int. Cl.
*H02K 5/10* (2006.01)
(52) U.S. Cl. ...................................................... 310/88
(58) Field of Classification Search .................... 310/88
See application file for complete search history.

(56) References Cited
U.S. PATENT DOCUMENTS 4,491,754 A * 1/1985 Gotoh .......................... 310/88
4,945,270 A * 7/1990 Okamoto ...................... 310/88
5,336,954 A * 8/1994 Shiroyama ................... 310/88

FOREIGN PATENT DOCUMENTS

JP  U 4-137460  12/1992
JP  11-27893  * 1/1999

* cited by examiner

*Primary Examiner*—Burton Mullins
(74) *Attorney, Agent, or Firm*—Oliff & Berridge, PLC

(57) ABSTRACT

The electric rotating machine includes a casing having first and second frames joined to each other at their opening ends in an axial direction, the first frame being formed with a fitting hole having an opened cross-sectional shape which opens to the opening end of the first frame. The electric rotating machine further includes a drain member made of rubber and fitted into the fitting hole. The drain member includes a fitting section having a neck portion through which a drain hole penetrates, and inner and outer collar portions facing with each other across from the neck portion. The drain member is installed on the first frame in such a state that the inner and outer collar portions abut against inner and outer wall surfaces of the first frame, respectively, by inserting the neck portion into the fitting hole from a side of the opening end of the first frame.

5 Claims, 4 Drawing Sheets

YOKE OPENING END

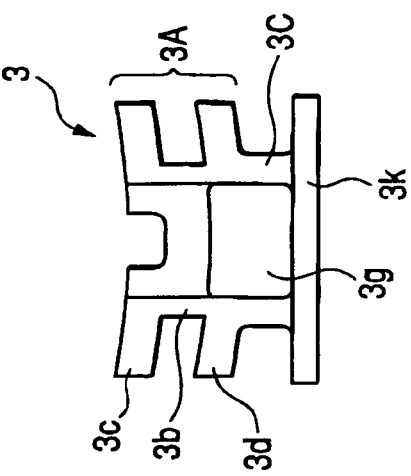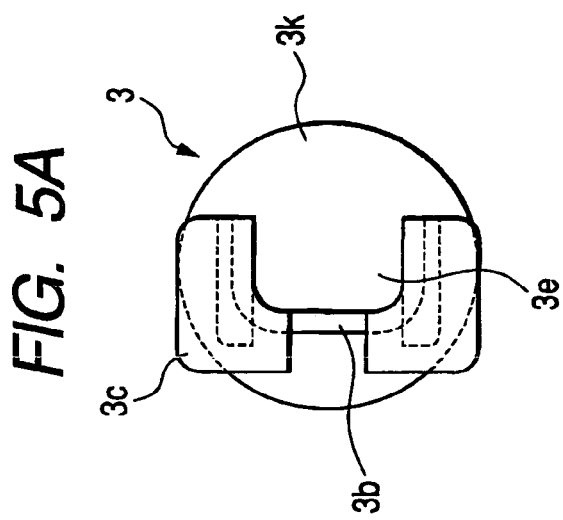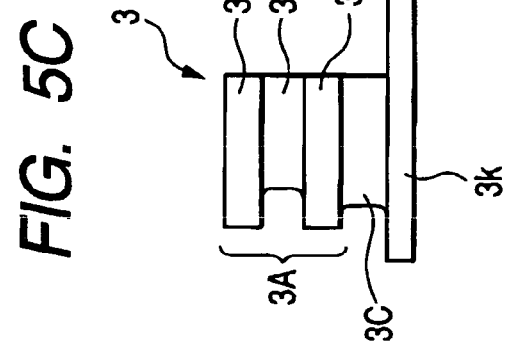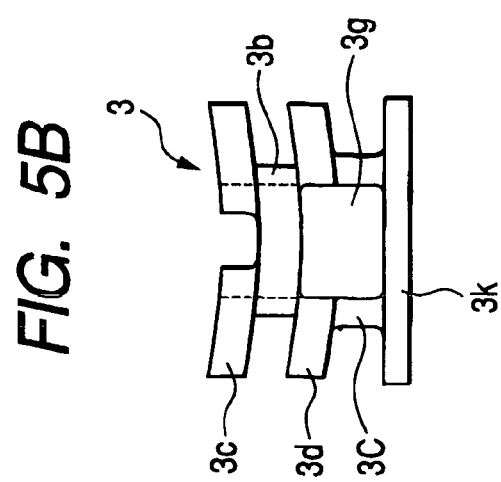

ELECTRIC ROTATING MACHINE

CROSS-REFERENCE TO RELATED APPLICATION

This application is related to Japanese Patent Application No. 2005-157550 filed on May 30, 2005, the contents of which are hereby incorporated by reference.

BACKGROUND OF THE INVENTION

1. Field of the Invention

The present invention relates to an electric rotating machine having a drain member installed on a casing thereof.

2. Description of Related Art

It is known to provide a starter motor with a water drain device as described, for example, in Japanese Utility Model application Laid-open No. 4-137460. This water drain device includes a rubber drain pipe installed on the machine case (end frame, for example) of the starter motor. The drain pipe includes a fitting section to be inserted into a round hole formed in the end frame, and a drain tube section which is integral with the fitting section. A drain passage runs from the fitting section to the drain tube section.

This drain device has a problem in that, in addition to fabricating work of the end frame itself, drilling work is needed for making the round hole in the end frame. Moreover, it becomes necessary to remove burrs around the round hole after the drilling work.

In addition, since the diameter of a head portion of the fitting section of the drain pipe, which is to be located inside the end frame, is larger than that of the round hole formed in the end frame, the fitting section has to be deformed so that it can pass through the round hole and enter inside the end frame at the time of installing the drain pipe. This results in lowering the installation workability of the drain pipe, and lengthening the installation time of the drain pipe.

It may occur that the installability of the drain pipe can be improved by reducing the interference between the fitting section of the drain pipe and the round hole of the end frame by increasing the inner diameter of the round hole. However, in this case, there arises a fear that the drain pipe can easily come off the end frame when an external force is applied.

SUMMARY OF THE INVENTION

The present invention provides an electric rotating machine comprising:

a casing including a first frame and a second frame joined to each other at opening ends of the first and second frames in an axial direction of the electric rotating machine, the first frame being formed with a fitting hole having an opened cross-sectional shape which opens to the opening end of the first frame; and a drain member made of rubber and fitted into the fitting hole;

the drain member including a fitting section fitted to the casing, the fitting section having a neck portion through which a drain hole penetrates, and inner and outer collar portions facing with each other across from the neck portion in a direction in which the drain hole extends, the drain member being installed on the first frame in such a state that the inner and outer collar portions abut against inner and outer wall surfaces of the first frame, respectively, by inserting the neck portion into the fitting hole from a side of the opening end of the first frame, and a part of the opening end of the second frame abuts against an abutment surface formed in the outer collar portion so that the neck portion inserted into the fitting hole is held in the axial direction between the first frame and the second frame.

The drain member may include a drain tube section integral with the fitting section, the drain tube section having a drain passage formed therein which is in communication with the drain hole, the drain passage having a labyrinthine structure.

The present invention also provides an electric rotating machine comprising:

a casing including a first frame and a second frame joined to each other at opening ends of the first and second frames in an axial direction of the electric rotating machine, the first frame being formed with a fitting hole having an opened cross-sectional shape which opens to the opening end of the first frame; and a drain member made of resin and fitted into the fitting hole;

the drain member including a fitting section fitted to the casing, and an outlet section located outside the casing, the fitting section having a neck portion through which a drain hole penetrates, and inner and outer collar portions facing with each other across from the neck portion in a direction in which the drain hole extends, the outlet section having a drain exit formed in a periphery thereof, the drain exit being in communication with the drain hole, the drain member being installed on the first frame in such a state that the inner and outer collar portions abut against inner and outer wall surfaces of the first frame, respectively, by inserting the neck portion into the fitting hole from a side of the opening end of the first frame.

The casing may include a yoke forming a magnetic path, a housing joined to one opening end of the yoke, and an end frame joined to the other opening end of the yoke, the first frame being the yoke, the second frame being one of the end frame and the housing.

The electric rotating machine may further comprise a pinion gear coupled to a shaft of the electric rotating machine, the pinion being engageable with a gear of an internal combustion engine.

According to the present invention, since the fitting hole for installation of the drain member is formed in the yoke (first frame) so as to open to the opening end of the yoke, the drain member can be fitted into the fitting hole from the opening end side of the yoke without pushing the fitting section of the drain member into the fitting hole unlike previously. More specifically, since the neck portion of the fitting section can be inserted into the fitting hole simply by sliding the fitting section from the opening end side of the yoke to the fitting hole side along the axial direction of the casing, any large force is not needed to install the drain member. This makes it possible to automate the installation process of the drain member to reduce the production cost.

Other advantages and features will become apparent from the following description including the drawings and claims.

BRIEF DESCRIPTION OF THE DRAWINGS

In the accompanying drawings:

FIG. 5A is a plan view of a drain member installed on a casing of a starter including an electric rotating machine according to a second embodiment of the invention;

FIG. 5B is a front view of the drain member;

FIG. 5C is a side view of the drain member; and

FIG. 5D is a rear view of the drain member.

PREFERRED EMBODIMENTS OF THE INVENTION

First Embodiment

Figure 1:
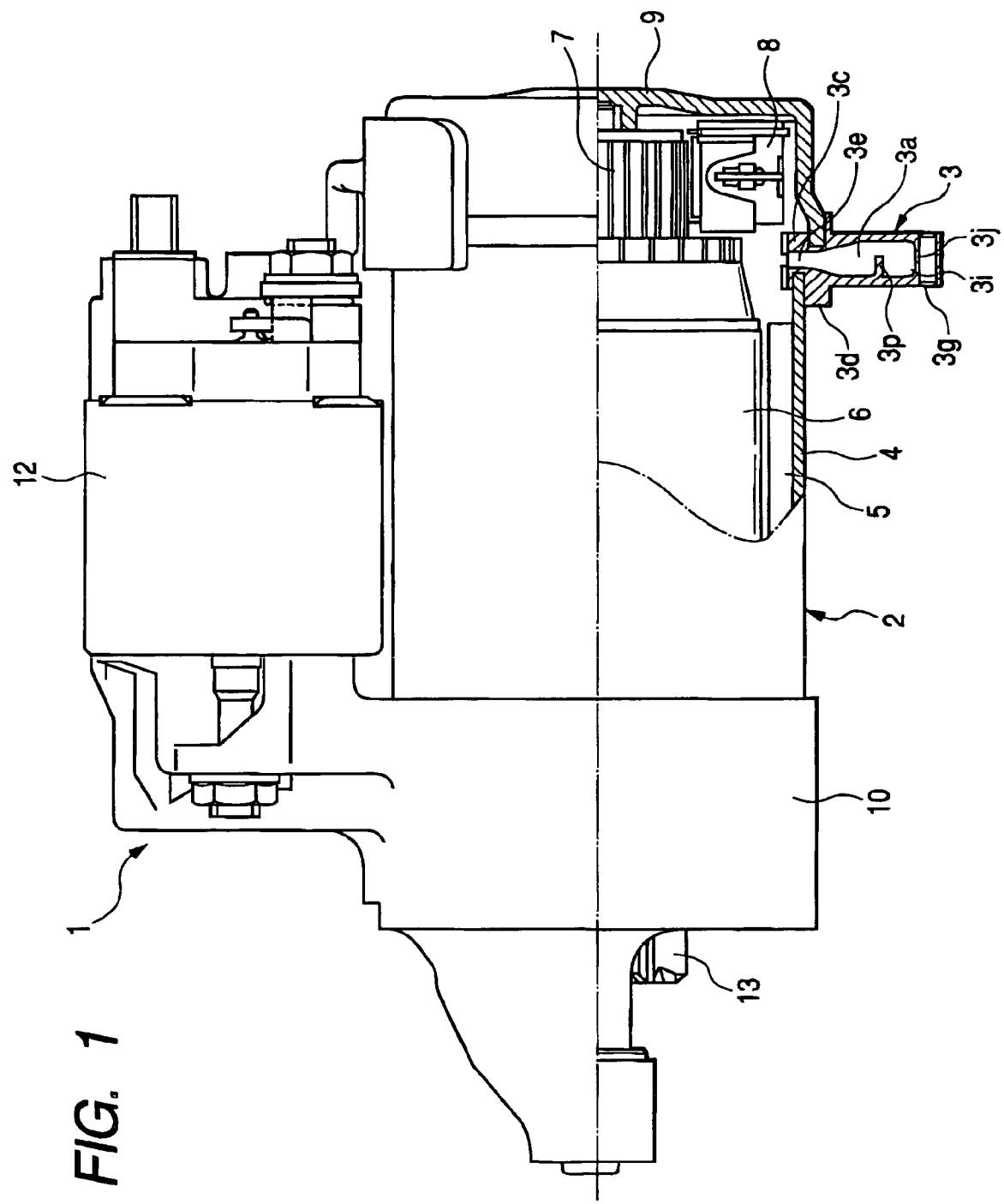
FIG. 1 is a partial cross-sectional view of a starter including an electric rotating machine according to a first embodiment of the invention.

The electric rotating machine according to a first embodiment of the invention is usable for a starter 1 of an internal combustion engine (vehicle engine). FIG. 1 is a partial cross-sectional view of the starter 1. The starter 1, which includes the electric rotating machine (referred to as a motor hereinafter) 2, is provided with a drain member 3 at a casing thereof. The motor 2, which is a DC motor in which a torque is developed at an armature by the action of an electromagnetic force generated by an field generator thereof, includes a field generator constituted by a plurality of permanent magnets (or field coils) disposed along the inner periphery of a yoke 4, an armature 6 rotatably disposed inside the field generator, a brush 8 in slidable contact with a commutator 7 of the armature 6, etc.

Figure 3:
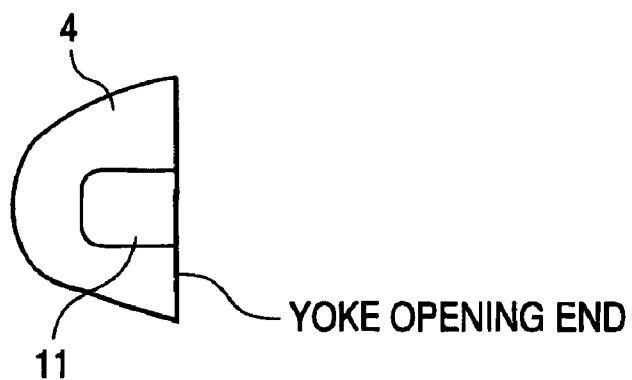
FIG. 3 is a diagram showing the shape of a fitting hole formed in a yoke constituting the casing of the starter.
Figure 4:
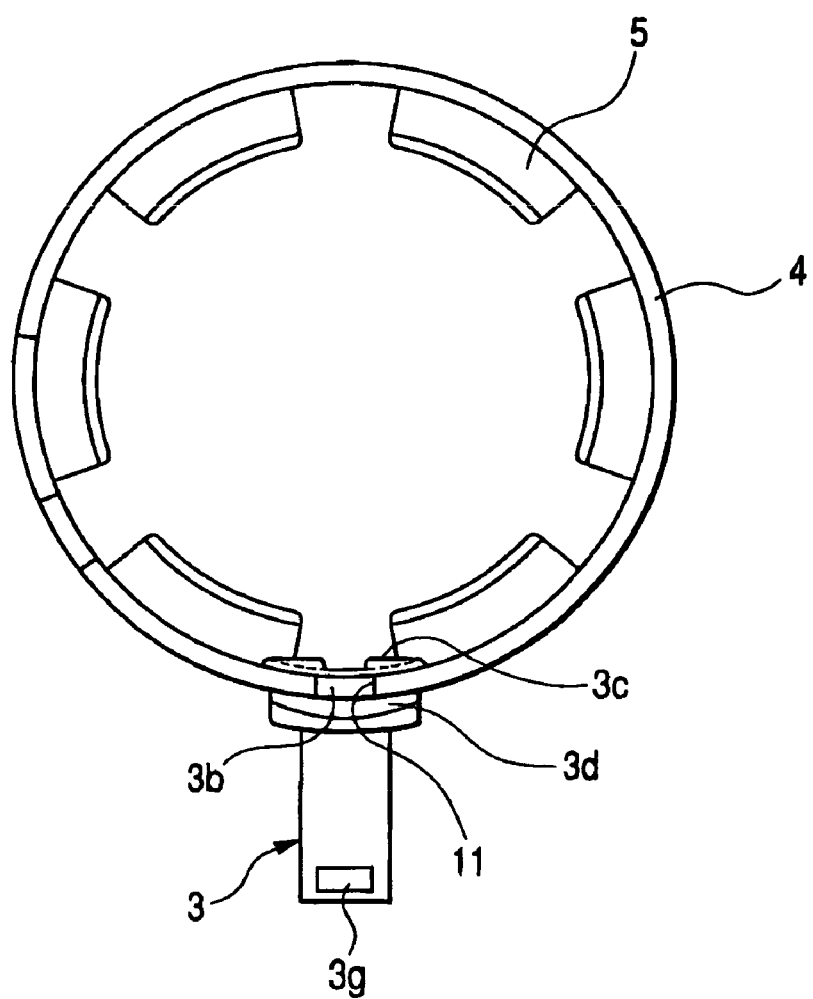
FIG. 4 is a diagram showing the drain member fitted to the fitting hole formed in the yoke when viewed along the axial direction.

The motor 2 has a casing constituted by the yoke 4 that forms a magnetic circuit, and an end frame 9. The casing is fixed to a front housing 10 by a through bolt (not shown). The yoke 4, which is formed in the shape of a hollow cylinder, is put between the front housing 10 and the end frame 9. The yoke 4 has a fitting hole 11 formed in its opening portion at the end frame 9 side (referred to as an "end side opening portion" hereinafter). The drain member 3 is fitted into this fitting hole 11. As shown in FIG. 3 and FIG. 4, the fitting hole 11 has a cross-sectional shape of not a closed round circle but a U which opens to an opening end of the yoke 4.

The end frame 9 is fitted into the end side opening portion of the yoke 4 by a spigot connection to cover the rear section of the motor 2 within which the commutator 7, brush 8, etc. are disposed. The drain member 3, which may be made of rubber, is constituted by a fitting section 3A for installation to the casing, and a drain tube section 3B having a drain passage 3a formed therein.

Figure 2A:
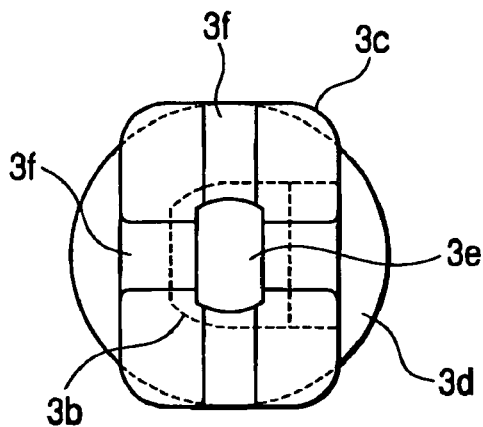
FIG. 2A is a plan view of a drain member installed on a casing of the starter.
Figure 2B:
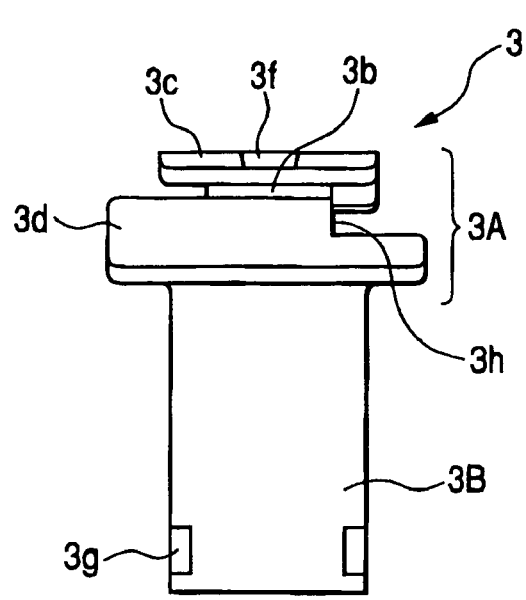
FIG. 2B is a side view of the drain member.
Figure 2C:
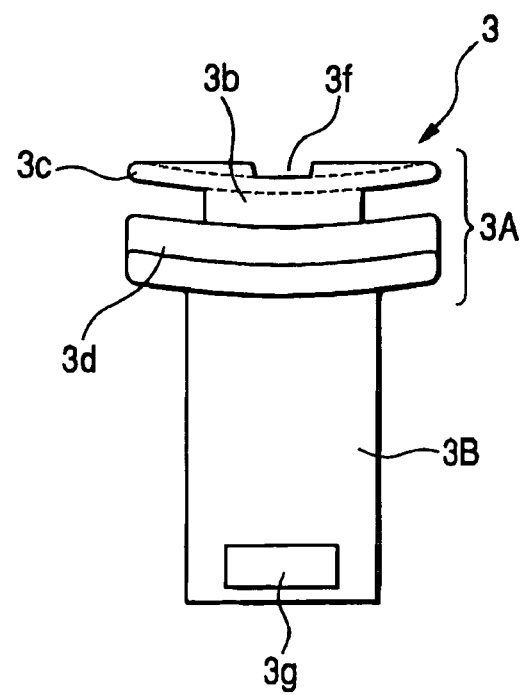
FIG. 2C is front view of the drain member.

The fitting section 3A includes a neck portion 3b inserted into the fitting hole 11 of the yoke 4, and inner and outer collar portions 3c and 3d facing each other across from the neck portion 3b. A drain hole 3e is formed so as to penetrate from the inner collar portion 3c to the outer collar portion 3d. As shown in FIG. 2C, each of the inner and outer collar portions 3c and 3d has a shape slightly curved when viewed from the axial direction of the motor 2 in order that they mate the cylindrical periphery of the yoke 4 when the drain member 3 is installed on the casing. As shown in FIG. 2A, the inner collar portion 3c has a plurality of drain grooves 3f formed on the surface thereof which lead to the drain hole 3e. These drain grooves serve to guide the water entered into the interior of the casing to the drain hole 3e. The outer collar portion 3d has an abutment surface 3h against which an opening end of the end frame 9 abuts.

The drain tube section 3B is formed integral with the fitting section 3A such that it extends in the direction in which the drain hole 3e penetrates the fitting section 3A. The drain tube section 3B has two drain exits 3g formed in the periphery of an end portion thereof. These drain exits 3g are in communication with the drain hole 3e through the drain passage 3a formed inside the drain tube section 3B. As shown in FIG. 1, a baffle plate 3p making the drain passage 3a have a labyrinthine structure, and a division plate 3i located downstream the baffle plate 3p are provided within the drain tube section 3B. The division plate 3i has a small aperture 3j narrowing the drain passage 3a.

The following is an explanation as to how the drain member 3 is installed on the casing. In advance of attaching the end frame 9 to the end side opening portion of the yoke 4, the neck portion 3b of the fitting section 3A is inserted into the fitting hole 11 from the opening end side of the yoke 4, so that the drain member 3 can be installed in a state in which the inner and outer collar portions 3c, 3d abut against the inner and outer wall surfaces of the yoke 4, respectively, as shown in FIG. 4. After that, the end frame 9 is attached to the end side opening portion of the yoke 4. At this time, since the opening end of the end frame 9 abuts against the abutment surface 3h of the outer collar portion 3d, the neck portion 3b is securely held between the yoke 4 and the end frame 9 as shown in FIG. 1. Incidentally, the installation location of the drain member 3 is such that the drain member 3 is at the bottom side of the starter 1 mounted on the vehicle engine.

The above described first embodiment offers the following advantages. Since the fitting hole 11 for installation of the drain member 3 is formed in the end side opening portion of the yoke 4 so as to open to the opening end of the yoke 4, the drain member 3 can be fitted into the fitting hole 11 from the opening end side of the yoke 4 without pushing the fitting section 3A of the drain member 3 into the fitting hole 11 unlike previously. More specifically, since the neck portion 3b of the fitting section 3A can be inserted into the fitting hole 11 simply by sliding the fitting section 3A from the opening end side of the yoke 4 to the fitting hole 11 side along the axial direction of the starter 1, any large force is not needed to install the drain member 3. This makes it possible to automate the installation process of the drain member 3 to reduce the production cost.

Furthermore, since the neck portion 3b of the fitting section 3A can be inserted into the fitting hole 11 from the opening end side of the yoke 4, it is not necessary to increase the gap between the neck portion 3b and the fitting hole 11 in view of improving the installability of the drain member 3. In other words, the installability of the drain member 3 is not worsened by reducing the gap between the neck portion 3b and the fitting hole 11. Furthermore, since the drain member 3 is installed on the casing in such a state that the inner and outer collar portions 3c, 3d abut against the inner and outer wall surfaces of the yoke 4, respectively, the drain member 3 does not come off easily when an external force is applied, if the gap between the neck portion 3b and the fitting hole 11 is not increased more than necessary.

Likewise, since the drain member 3 is installed on the casing in such a state that the neck portion 3b is securely held between the yoke 4 and the end frame 9, and is therefore pressed in the axial direction, the neck portion 3b can be prevented from rattling in the axial direction and coming off the yoke 4. In addition, since the fitting hole 11 formed in the yoke 4 has a cross-sectional shape of not a closed round circle but a U which opens to the opening end of the yoke 4, the fitting hole 11 can be made concurrently at the time of press-punching a steel sheet as a material of the yoke 4. This improves the productivity, because the hole making process that has been previously necessary can be removed.

Incidentally, since the drain member 3 is made of rubber, the distance between the inner and outer collar portions 3c and 3a, that is, the thickness of the neck portion 3b may be equal to or slightly smaller than the wall thickness of the yoke 4, so that the neck portion 3b is press-fitted into the fitting hole 11. In this case, since the inner collar portion 3c is brought into close contact with the inner periphery of the yoke 4, and the outer collar portion 3d is brought into close contact with the outer periphery of the yoke 4, sealing performance is improved. It is a matter of course that the installability of the drain member 3 is improved if the thickness of the neck portion 3b is made slightly larger than the wall thickness of the yoke 4.

Second Embodiment

In a case where the drain member 3 is installed on the casing by pushing the fitting section 3A into the fitting hole 11 from outside the casing, the fitting section 3A of the drain member 3 has to be made of rubber, because the fitting section 3A must be deformed to pass through the fitting hole 11. However, according to the present invention, the drain member 3 can be made of resin, because the neck portion 3b of the fitting section 3A can be inserted into the fitting hole 11 by sliding the fitting section 3A from the opening end side of the yoke 4 to the fitting hole 11 side along the axial direction of the starter 1.

One example of the drain member 3 made of resin is shown in FIGS. 5A to 5D. FIG. 5A is a plan view of the drain member 3, FIG. 5B is a front view of the drain member 3, FIG. 5C is a side view of the drain member 3, and FIG. 5D is a rear view of the drain member 3. Here, the front side means the front housing 10 side with respect to the drain member 3, and the rear side means the end frame 9 side with respect to the drain member 3. This drain member 3 includes the fitting section 3A for installation to the casing, and an outlet section 3C integral with the fitting section 3A.

As in the case of the first embodiment, the fitting section 3A includes the neck portion 3b to be inserted into the fitting hole 11 formed in the yoke 4, and the inner and outer collar portions 3c and 3d facing each other across from the neck portion 3b. And the drain hole 3e is formed so as to penetrate from the inner collar portion 3c to the outer collar portion 3d. The outlet section 3C, which extends from the outer collar portion 3d to the opposite side of the fitting section 3A, has two drain exits 3g formed in a front side periphery and a rear side periphery thereof, respectively. These drain exits 3g are in communication with the drain hole 3e within the outlet section 3C. The outlet section 3C is provided with a circular end plate 3k at its end portion. The end plate 3k can serve to suppress water intrusion into the interior of the drain member 3 when the starter 1 is flooded, because the surface of the end plate 3k is orthogonal to the opening planes of the drain exits 3g, and projects beyond these opening planes.

The drain member 3 made of resin in this embodiment can be installed on the casing in the same manner as the first embodiment. That is, in advance of attaching the end frame 9 to the end side opening portion of the yoke 4, the neck portion 3b of the fitting section 3A is inserted into the fitting hole 11 from the opening end side of the yoke 4, so that the drain member 3 can be installed in a state in which the inner and outer collar portions 3c, 3d abut against the inner and outer wall surfaces of the yoke 4, respectively. After that, the end frame 9 is attached to the end side opening portion of the yoke 4. At this time, the neck portion 3b is securely held between the yoke 4 and the end frame 9 as shown in FIG. 1.

Accordingly, also in the case where the drain member 3 is made of resin, the installation work of the drain member 3 on the casing can be facilitated as in the first embodiment in which the drain member 3 is made of rubber. In addition, making the drain member 3 from resin facilitates automating the installation process of the drain member 3 by use of a robot, because the drain member 3 made of resin can keep its shape during installation thereof. Furthermore, making the drain member 3 from resin makes it possible to reduce the length of the outlet section 3C projecting from the outer collar portion 3d. For example, the length between the outer collar portion 3d and the end plate 3k can be made smaller than the thickness of the fitting section 3A as shown in FIG. 5. This reduces the possibility that the outlet section 3C of the drain member 3 interferes with other auxiliaries, and as a result the mounting work of the starter 1 on a vehicle can be facilitated. Moreover, the chance of the fitting section 3A being applied with a large external force is very small due to the short length of the outlet section 3C. This makes it possible to prevent the drain member 3 from easily coming off the yoke 4.

It is a matter of course that various modifications can be made to the above described embodiment as described below. Although the fitting hole 11 is formed in the end side opening portion of the yoke 4 in the first and second embodiments, it may be formed in the front side opening portion of the yoke 4 adjoining the front housing 10. The fitting hole 11 may be formed not in the yoke 4 but in the opening portion of the end frame 9 or in the opening portion of the front housing 10. The fitting hole 11 may be formed in both of the yoke 4 and the end frame 9, or in both of the yoke 4 and the front housing 10. However, it should be noted that the fitting hole 11 is made to have not a closed cross-sectional shape but an opened cross-sectional shape.

In a case where the starter 1 is provided with a center case or the like between the front housing 10 and the yoke 4, the fitting hole 11 may be formed in the center case. In short, the fixing hole 11 can be formed in any frame other than the yoke 4 constituting the casing. Incidentally, the starter 1 shown in FIG. 1 is of the type in which, when the electromagnetic switch 12 is turned on, a pinion gear 13 is pushed out to the opposite side of the motor 2 (in the leftward direction in FIG. 1) to be engaged with a ring gear (not shown) of the engine, the present invention is applicable to starters of any type. Although the invention has been described above in relation to preferred embodiments directed to a vehicle engine starter, it should be noted that the invention is applicable to various electric rotating machines including generators, and electric motors.

The above explained preferred embodiments are exemplary of the invention of the present application which is described solely by the claims appended below. It should be understood that modifications of the preferred embodiments may be made as would occur to one of skill in the art.

What is claimed is:

1. An electric rotating machine comprising:

a casing including a first frame and a second frame joined to each other at opening ends of said first and second frames in an axial direction of said electric rotating machine, said first frame being formed with a fitting hole having an opened cross-sectional shape which opens to said opening end of said first frame, said casing including a yoke forming a magnetic path, a housing joined to one opening end of said yoke and an end frame joined to the other opening end of said yoke, said first frame being said yoke, said second frame being one of said end frame and said housing; and a drain member made of rubber and fitted into said fitting hole said drain member including a fitting section fitted to said casing, said fitting section having a neck portion through which a drain hole penetrates, and inner and outer collar portions facing with each other across from said neck portion in a direction in which said drain hole extends, and said drain member being installed on said first frame in such a state that said inner and outer collar portions abut against inner and outer wall surfaces of said first frame, respectively, by inserting said neck portion into said fitting hole from a side of said opening end of said first frame, and a part of said opening end of said second frame abuts against an abutment surface formed in said outer collar portion so that said neck portion inserted into said fitting hole is held in said axial direction between said first frame and said second frame.

2. The electric rotating machine according to claim 1, wherein said drain member includes a drain tube section integral with said fitting section, said drain tube section having a drain passage formed therein which is in communication with said drain hole, said drain passage having a labyrinthine structure.

3. The electric rotating machine according to claim 1, further comprising a pinion gear coupled to a shaft of said electric rotating machine, said pinion being engageable with a gear of an internal combustion engine.

4. An electric rotating machine comprising:

a casing including a first frame and a second frame joined to each other at opening ends of said first and second frames in an axial direction of said electric rotating machine, said first frame being formed with a fitting hole having an opened cross-sectional shape which opens to said opening end of said first frame, said casing including a yoke forming a magnetic path, a housing joined to one opening end of said yoke and an end frame joined to the other opening end of said yoke, said first frame being said yoke, said second frame being one of said end frame and said housing; and a drain member made of resin and fitted into said fitting hole, said drain member including a fitting section fitted to said casing, and an outlet section located outside said casing, and said fitting section having a neck portion through which a drain hole penetrates, and inner and outer collar portions facing with each other across from said neck portion in a direction in which said drain hole extends, said outlet section having a drain exit formed in a periphery thereof, said drain exit being in communication with said drain hole, and said drain member being installed on said first frame in such a state that said inner and outer collar portions abut against inner and outer wall surfaces of said first frame, respectively, by inserting said neck portion into said fitting hole from a side of said opening end of said first frame.

5. The electric rotating machine according to claim 4, further comprising a pinion gear coupled to a shaft of said electric rotating machine, said pinion being engageable with a gear of an internal combustion engine.

* * * * *